Figures 1, 2, 3:
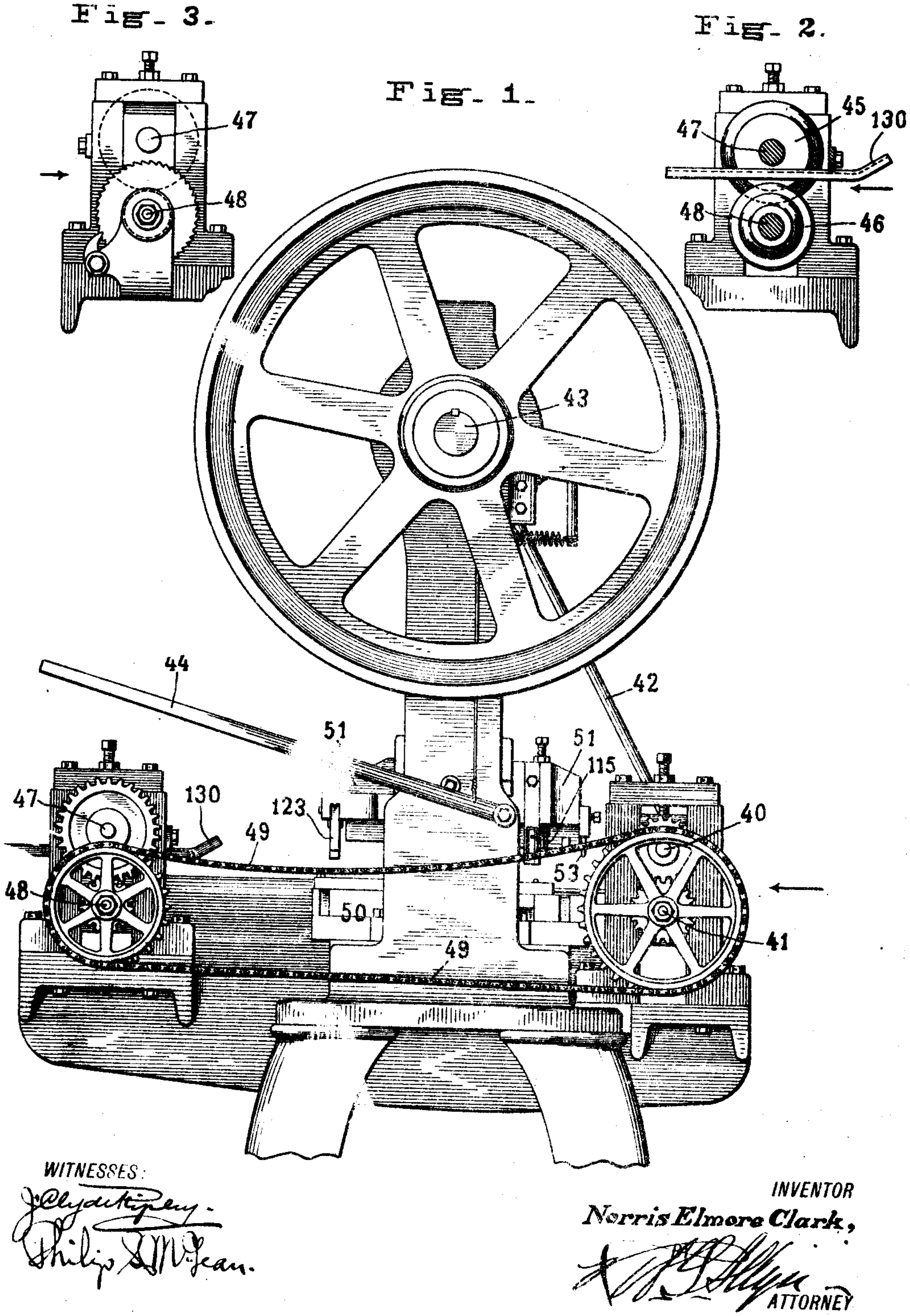

N. E. CLARK.

MACHINE FOR MAKING CORNER BEAD, &c.

APPLICATION FILED OCT. 28, 1913.

1,129,454.

Patented Feb. 23, 1915.

7 SHEETS—SHEET 1.

WITNESSES:

J. Clyde Kipley.

Philip S. McLean.

INVENTOR

Norris Elmore Clark,

ATTORNEY

N. E. CLARK.

MACHINE FOR MAKING CORNER BEAD, &c.

APPLICATION FILED OCT. 29, 1913.

1,129,454.

Patented Feb. 23, 1915.

7 SHEETS—SHEET 2.

WITNESSES:

J. Clyde Kipley.

Philip S. McLean.

INVENTOR

Norris Elmore Clark,

BY

ATTORNEY

N. E. CLARK.
MACHINE FOR MAKING CORNER BEAD, &c.
APPLICATION FILED OCT. 29, 1913.

1,129,454. Patented Feb. 23, 1915.

7 SHEETS—SHEET 3.

WITNESSES:
J. Clyde Kepley
Philip S. McLean

INVENTOR
Norris Elmore Clark.
BY K. W. Allyn
ATTORNEY

N. E. CLARK.
MACHINE FOR MAKING CORNER BEAD, &c.
APPLICATION FILED OCT. 28, 1913.

1,129,454.

Patented Feb. 23, 1915.

7 SHEETS—SHEET 4.

WITNESSES:
J. Clyde Kipley.
Philip D. McBean.

INVENTOR
Norris Elmore Clark,
BY
[signature]
ATTORNEY

N. E. CLARK.
MACHINE FOR MAKING CORNER BEAD, &c.
APPLICATION FILED OCT. 28, 1913.

1,129,454. Patented Feb. 23, 1915.

7 SHEETS—SHEET 5.

WITNESSES:
Clyde Ripley
Philip S McLean

INVENTOR
Norris Elmore Clark
BY [signature]
ATTORNEY

N. E. CLARK.
MACHINE FOR MAKING CORNER BEAD, &c.
APPLICATION FILED OCT. 29, 1913.
1,129,454.
Patented Feb. 23, 1915.
7 SHEETS—SHEET 6.
Fig. 18.
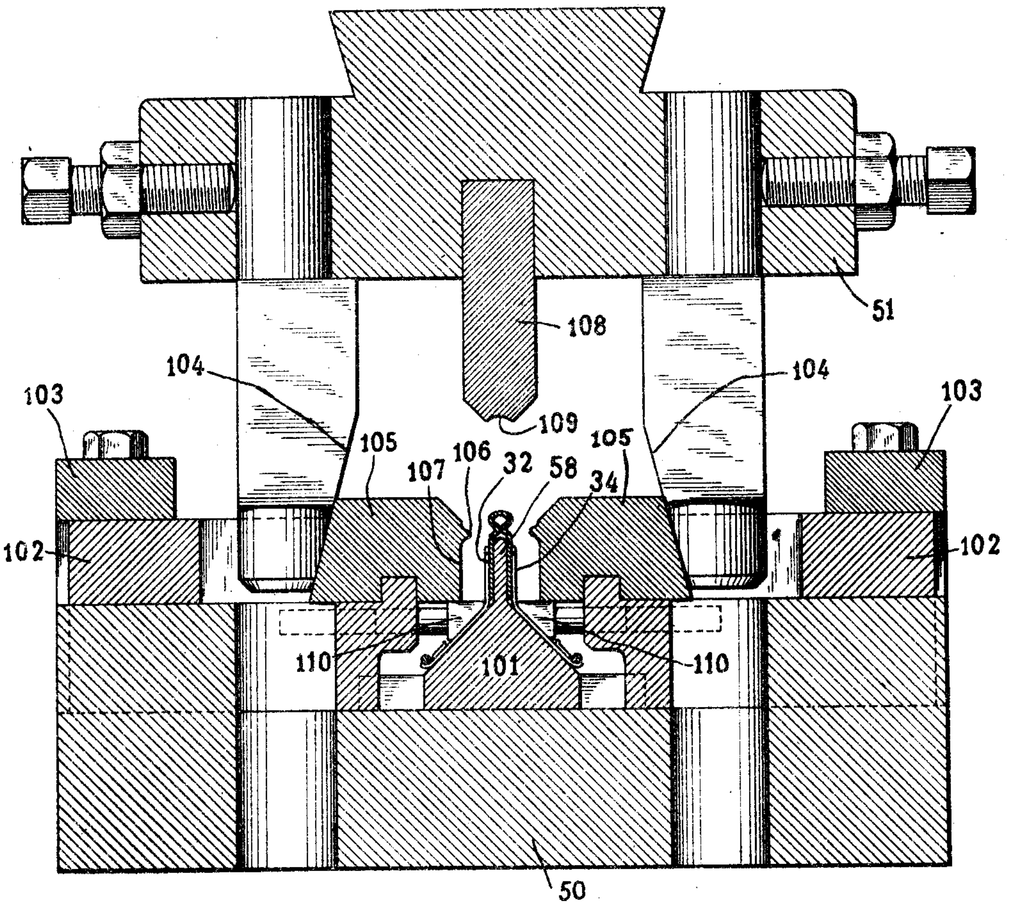
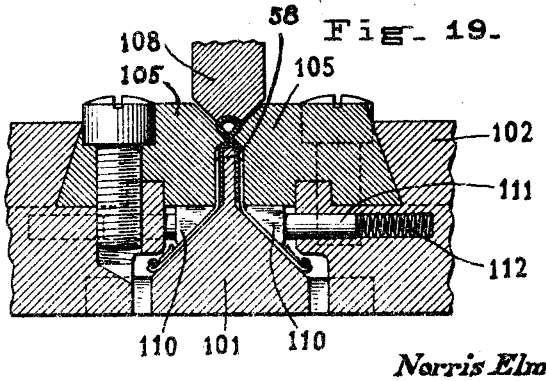
Fig. 19.
WITNESSES:
J. Clyde Kipley
Philip S. McLean
INVENTOR
Norris Elmore Clark,
BY [signature] ATTORNEY.

N. E. CLARK.
MACHINE FOR MAKING CORNER BEAD, &c.
APPLICATION FILED OCT. 29, 1913.

1,129,454.

Patented Feb. 23, 1915.

7 SHEETS—SHEET 7.

WITNESSES:
J. Clyde Kipley.
Philip S. McLean.

INVENTOR
Norris Elmore Clark,
by H. P. Doolittle
ATTORNEY

UNITED STATES PATENT OFFICE.

NORRIS ELMORE CLARK, OF PLAINVILLE, CONNECTICUT.

MACHINE FOR MAKING CORNER-BEAD, &c.

1,129,454. Specification of Letters Patent. Patented Feb. 23, 1915.

Application filed October 29, 1913. Serial No. 797,982.

*To all whom it may concern:*

Be it known that I, NORRIS ELMORE CLARK, a citizen of the United States of America, and residing at Plainville, in the county of Hartford and State of Connecticut, have invented new and useful Improvements in Machines for Making Corner-Bead, &c., of which the following is a specification.

This invention relates to metal working and particularly to machines for automatically forming metallic reinforcements for cement and concrete and usually known as corner bead.

One object is to provide a machine which will automatically form the article from strips of metal without the necessity of handling, all the operations of feeding, punching and forming being automatic.

The specific object is to automatically cut arms from the sides of a strip and fold the strip and arms into angular form.

Another object is to insure accurate feeding and forming.

Another object is to insure the article being straight as it comes from the machine.

Another object is to automatically attach lateral reinforcing wires.

The machine herein disclosed is designed particularly for the carrying out of the steps of operation disclosed in my application Serial No. 698,078, filed May 17, 1912.

In carrying out these objects a strip of metal from which the main body and arms of the article are formed is intermittently fed into the machine by suitable rolls not shown. Other rolls are provided for feeding the product out of the machine and these latter rolls serve to assist in attaching the side wires. The lower forming dies are carried by a stationary bed and the coöperating upper dies are carried by a reciprocating head in a manner common in continuously operating presses. In forming the particular corner bead illustrated herein, arms are cut from the sides of a strip by means of suitable cutting dies. The stock is then fed forwardly one step and the ends of the arms are bent upwardly and while the arms are being cut and bent, the center of the strip is ribbed to stiffen it and to start the formation of the bead proper. The lower die which coöperates with the corresponding upper die to form the rib constitutes the beginning of a center guide or support which extends through the machine and becomes narrower toward the exit. The strip is then fed forward one step and at the next stroke of the press the edges of the bead of the strip are bent or flanged downwardly over the edges of the center support carrying the arms with them. The stock is then fed forward another step and at the next stroke of the press the arms are folded down at their bases and their ends bent outwardly to form the corner receiving angle. The stock is then fed forward another step and at the next stroke of the press laterally operating jaws are brought toward each other to indent the sides above the center guiding support and at the same time a hammer blow is struck by means of a punch along the upper edge of the bead so as to straighten and stiffen the structure and form the desired protruding shoulders of the bead proper. A stripper is provided for stripping the stock from the upper cutter and a lifter is provided for stripping the stock from the lower dies. Laterally movable grooved guides are brought in to position at each stroke for gripping the edges of the stock as it approaches the cutters. The same lifting plate which strips the stock from between the die cutters also strips it clear of the lower angular dies which bend the arms upward. A pair of longitudinally extending shoes are spring pressed inwardly at opposite sides adjacent the lateral indenting dies for holding the stock at this point. When it is desired to provide lateral reinforcing wires they may be attached to the arms by curling over portions of the ends. In the form shown tangs are punched from the ends of the arms at the same time that the arms are cut from the edges of the strip. The wires are fed through lateral guide tubes into position adjacent the ends of the arms at a point in the machine beyond the lateral operating dies and the tangs are curled down and outward over the wires by means of suitable curling members which coöperate with lateral supporting dies. In this case the feeding out rolls are so constructed and adjusted as to roll the tangs and ends of the arms into the wires so as to prevent relative longitudinal displacement and a holding bar is provided between the rolls for holding the corner bead in position and preventing it from being displaced by the rolling action.

The parts are purposely constructed and arranged so that the different cutters and dies may be readily inserted or removed for the purpose of repair and renewal and to permit of adjustment and substitution so that the machine is not limited to the production of a corner bead of the particular construction and dimensions shown.

While the machine as shown is designed to produce the finished article from the coil or plain strip of metal and coils of wire, and this is considered to be one of the great advantages of the invention, it should be understood however that certain advantages may be attained within the scope of the invention by performing the cutting operation in one machine and the bending operations in another machine. Similarly the bead may be otherwise completed in one machine and the wires attached in another machine.

Figure 4:
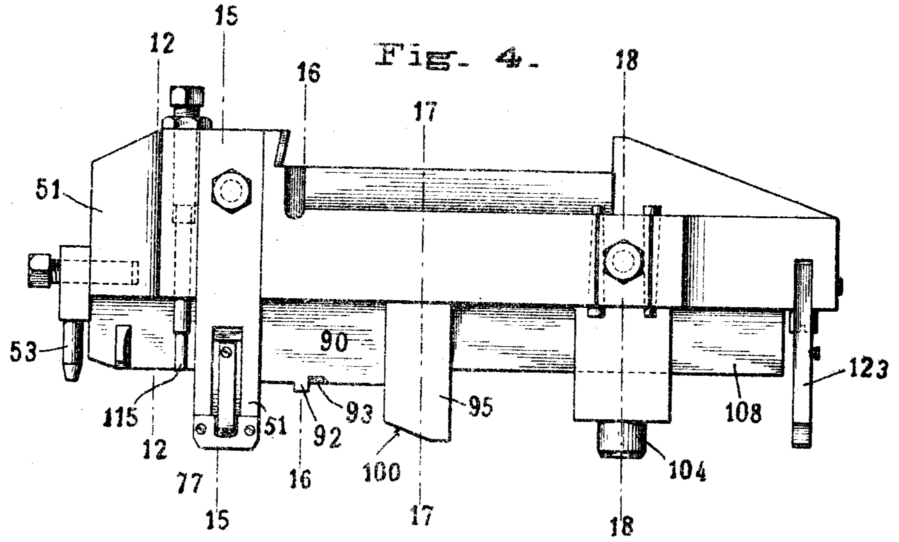
Figure 6:
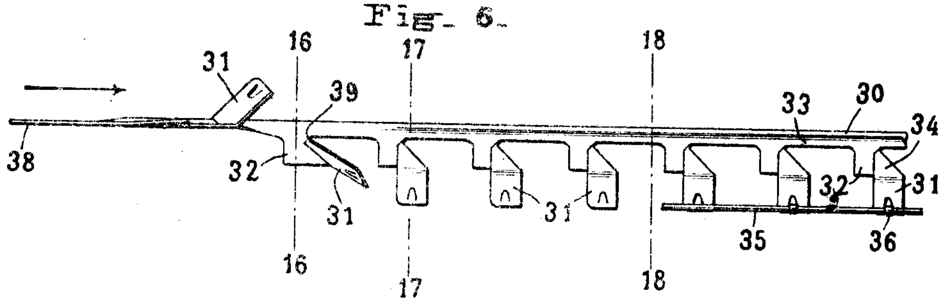
Figure 5:
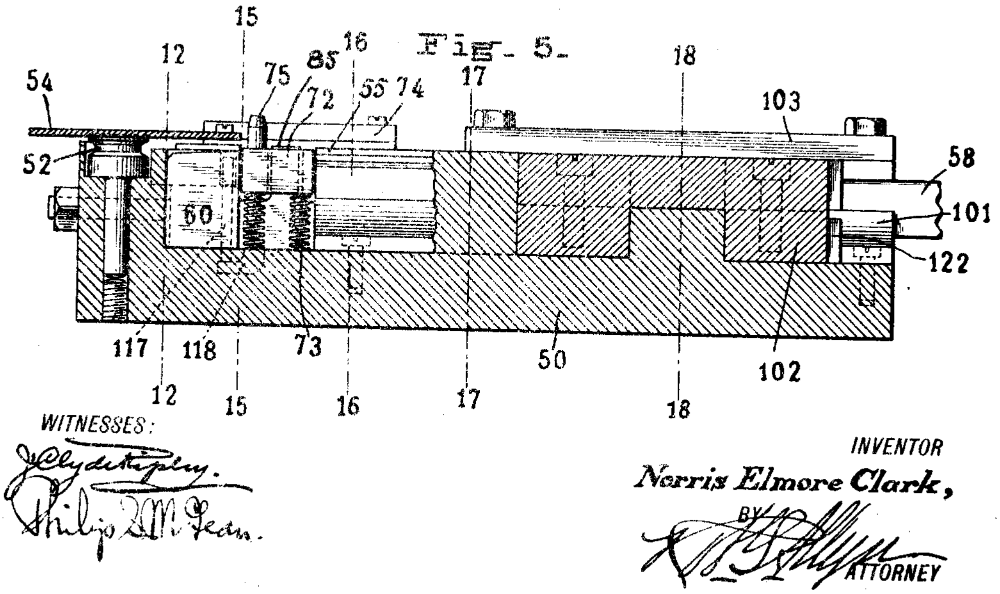
Figures 7, 8, 9, 10, 11:
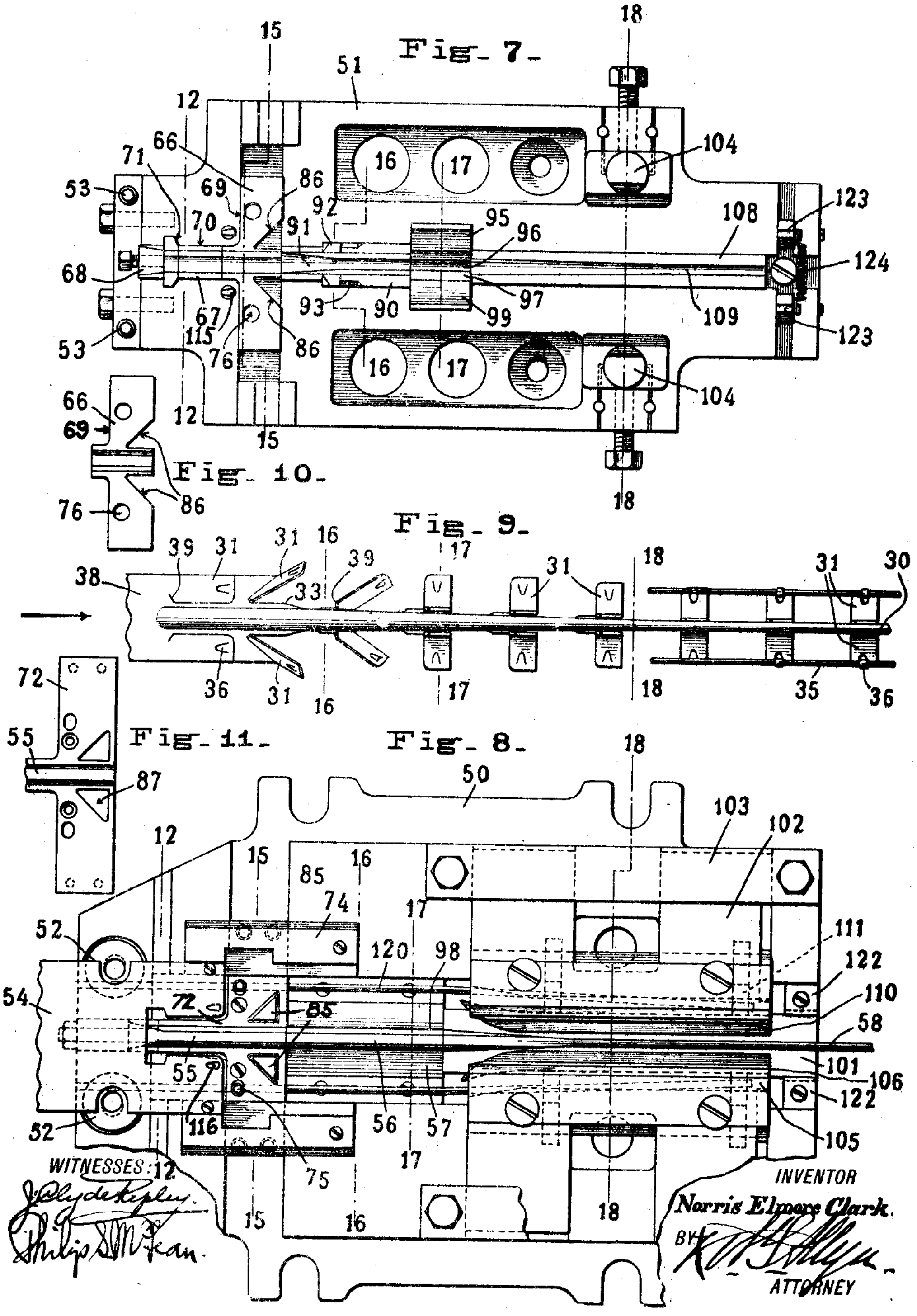
Figures 12, 13, 14, 15:
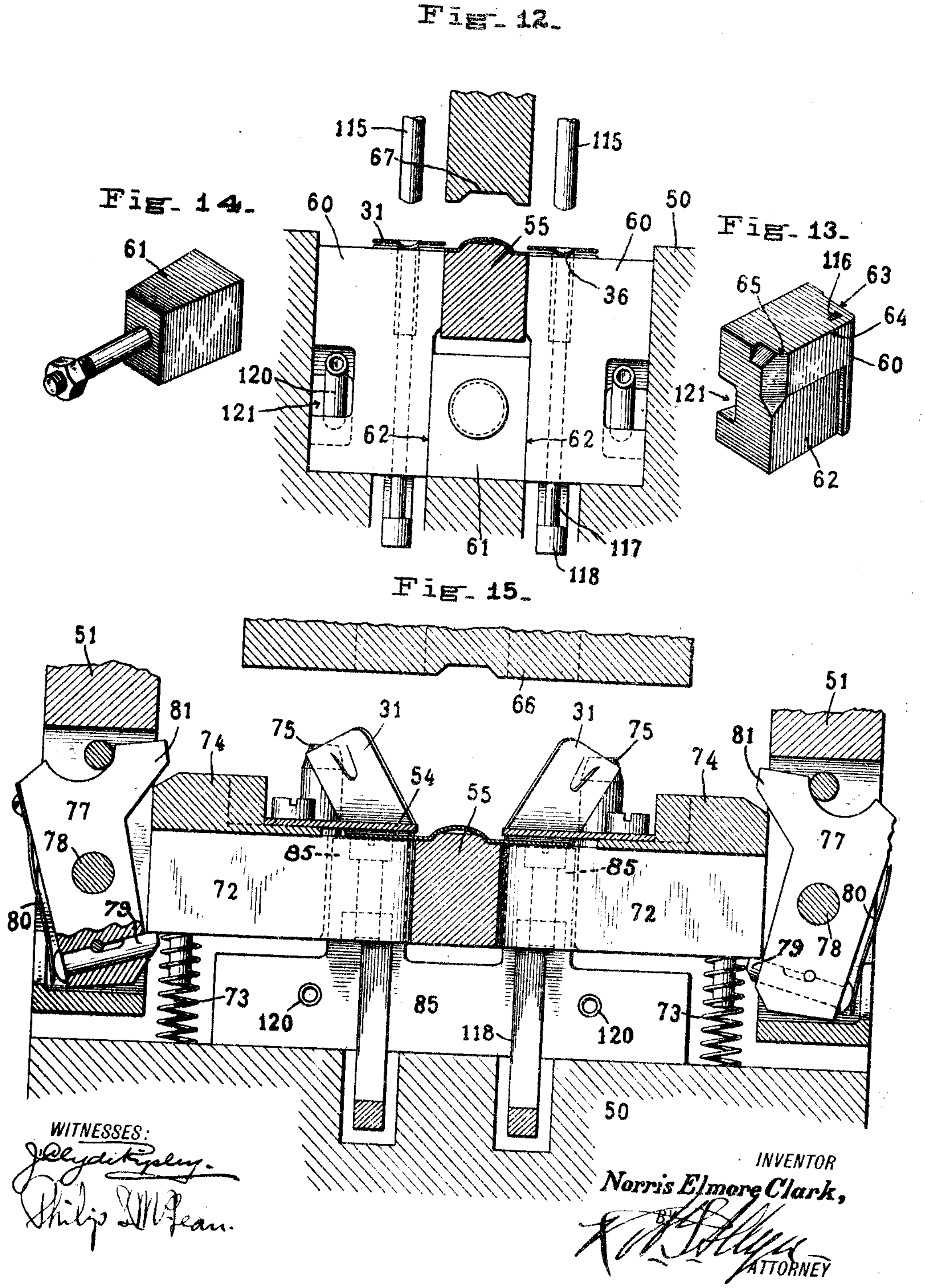
Figure 16:
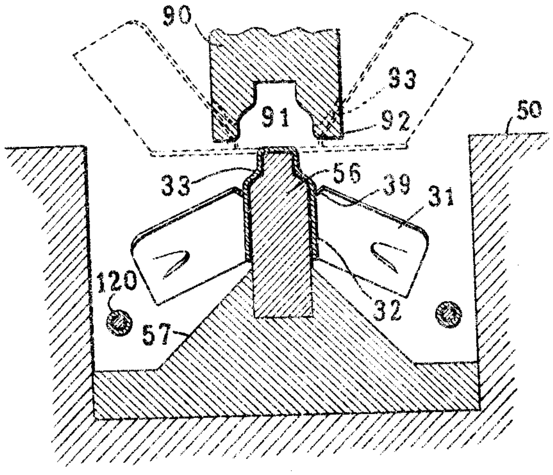
Figure 17:
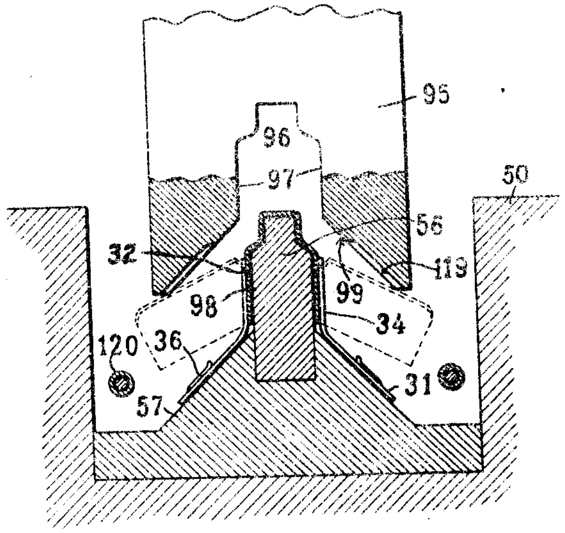
Figure 20:
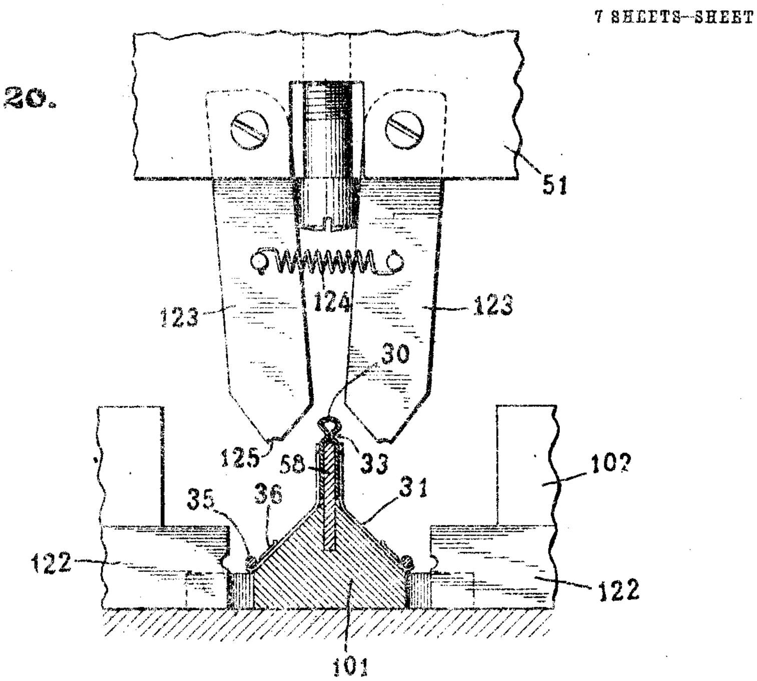
Figure 21:
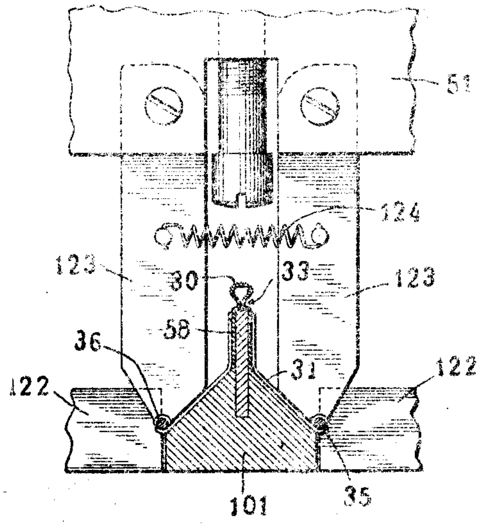
Figure 22:
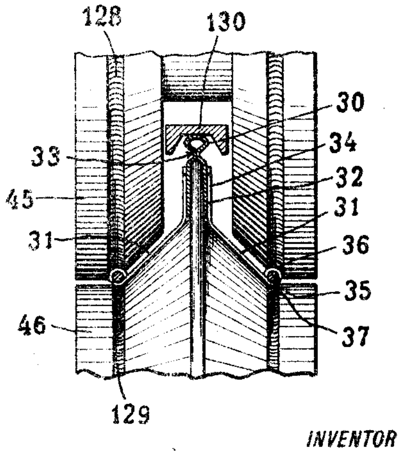

Figure 1, is a side view of a machine embodying the improvements of the invention. Fig. 2, is a vertical section of the feeding-out rolls. Fig. 3, is a view from the rear side of the ratchet mechanism for preventing the feeding-out rolls from rotating backward. Fig. 4, is a side view of the reciprocating punch member carrying vetrically movable parts of the dies. This view and Figs. 5 and 6 are both taken from the side of the machine opposite to that shown in Fig. 1. Fig. 5, is a longitudinal sectional view showing parts of the relatively stationary die members in the position corresponding to Fig. 4. Fig. 6, is a side view of the product showing the different steps of the operation between the parts of the die mechanism of Figs. 4 and 5 which have just acted. Fig. 7, is a view of the under side of the vertically movable punch member. Fig. 8, is a plan view of the lower die members. Fig. 9, is a plan view of the product showing the different steps in their proper position relative to the dies in Figs. 7 and 8. Fig. 10, is a view of the under side of one of the upper die members constituting a part of the punch cutter and arm bender. Fig. 11, is a plan view of a part of the stripper or lifter located between the lower die cutters and surrounding the lower arm bending dies. The positions of the parts in Figs. 7 to 11 inclusive correspond to the positions in Figs. 4 to 6 inclusively. Fig. 12, is a vertical sectional view on the plane of the line 12—12 of Figs. 4, 5, 7 and 8 looking toward the right but on a larger scale and showing the cutting and punching dies. Fig. 13, is a detail perspective view of one of the lower die cutters on a scale larger than Fig. 8 but smaller than Fig. 12. Fig. 14, is a perspective view of a wedge for clamping the lower die cutters. Fig. 15, is a vertical sectional view on the plane of the line 15—15 in Figs. 4, 5, 7, and 8 looking toward the right and showing part of the arm bending dies and the lifter plate and ribbing dies. Figs. 12 and 15 to 22 inclusive are substantially full size. Fig. 16, is a vertical sectional view on the plane of the line 16—16 of Figs. 4, 5, 7 and 8 showing the dies for bending the edges of the body of the strip downward. Fig. 17, is a vertical sectional view on the plane of the line 17—17 of Figs. 4, 5, 7 and 8 showing the dies for folding the bases of the arms inwardly and bending the ends outwardly to form a corner receiving angle. Fig. 18, is a vertical sectional view on the plane of the line 18—18 of Figs. 4, 5, 7 and 8 and showing the center support and guide, the holding shoes, the laterally operating indenting jaws or dies and the vertically movable straightening punch or die. Fig. 19, is a similar sectional view showing the parts closed in the forming operation. Fig. 20, is a view taken from the right hand end of Figs. 4, 5, 7 and 8 looking toward the left and showing the dies for attaching the side wires. Fig. 21, is a similar view at the completion of the attaching operation. Fig. 22, is a view showing fragments of the feeding-out rolls and the holding bar.

The construction and operation will perhaps be more clearly understood by first referring to the product which this machine was particularly designed to form. This is shown in Figs. 6, 9 and 22. The front edge 30 or bead proper, is rounded or "bull-nosed", as it is sometimes termed. The arms 31, 31 are arranged in pairs connected to the bead proper by lugs 32. The rear edges 33 of the bead proper are indented in rear of the front edge so as to afford plaster receiving shoulders at the rear edges of the front portion. The bases 34 of the arms are folded over against the lugs. The lateral or side reinforcing wires 35 are secured to the ends of the arms by means of tangs 36 which are curled over. The extreme ends of the arms also preferably curl outward at 37 somewhat, to fit the wires. The product is made from a narrow strip 38.

Suitable feeding-in rolls (not shown) are provided on the shafts 40 and 41 which are geared together and operated in a manner customary in automatic machines, for instance, by a connecting rod 42 from an eccentric (not shown) on the main drive shaft 43. A controlling lever 44 is provided for a suitable starting and stopping clutch (not shown). The product is fed from the machine by rolls 45 and 46 on shafts 47 and 48 which are suitably geared together and driven from the shaft 41 by suitable means for instance, a chain 49. The lower die members are carried by a stationary holder 50 and the vertically movable die members are carried by a holder 51 reciprocated in a suitable manner by the shaft 43 as is customary in reciprocating presses.

The stock is guided and held in place by grooved wheels 52 at each side [illegible]

[illegible] by the punch. The [illegible] between the guides [illegible] beneath the stripper plate 54 and the center of the [illegible] on the [illegible] support [illegible] cutters and on the [illegible] and the guide 58.

The lower die [illegible] as shown in Figs. 12 and [illegible] supported in the holder 60 and [illegible] and arranged to cut out the [illegible] shown at the left in Fig. 9. The two [illegible] are clamped in place by means [illegible] which is drawn between the opposing faces 62, 62 of the cutters.

63, 64, 65 are the cutting edges, the edge 63 being cut back slightly so as to draw over the end of the arm as shown at 37 in Fig. 22. The corresponding upper dies or punch cutters as shown in Fig. 7, consist of dies 66, 67, and 68 which have respectively cutting edges 69, 70 and 71 for coöperating respectively with the cutting edges 63, 64 and 65 of the lower die cutters.

The stripper [illegible] over the lower die [illegible] punch cutters 67 and 68. The [illegible] plate 72 is of T-shape and [illegible] the punch cutters 66, [illegible] the ends and between the [illegible]. This plate 72 is [illegible] edge as a die 73 for coöperating with the corresponding part of the upper [illegible] 66, 67, and [illegible] between the arms as shown [illegible]. The plate 72 [illegible] [illegible]

[illegible]

and serve to strip the stock from the lower bending [illegible]

The [illegible] die member 90 coöperates with the [illegible] and guide member 56 in bending [illegible] the edges 35 of the corner [illegible]. The groove 91 in the die member 90 is tapered as shown in Fig. 7 so as to cause the bend to take place more gradually as indicated in Figs. 6 and 9. The projecting fingers 92 are adapted to extend down the sides of the lugs 32 and the die member 90 is cut away at 93 to clear the rear corners 39 of the arms.

The upper die member 95 coöperates with the supporting die portions 56 and 57 to fold the bases of the arms downward and bend the ends outward, as shown in Fig. 17. The upper part of the groove 96 is shaped substantially the same as the upper part of the groove 91 and corresponds with the upper part of the supporting guide die 56. The side walls 97 engage the bases 34 of the arms 31 and fold them against the lugs 32 supported by the side walls 98 of the lower die member. The inclined walls 99 engage the ends of the arms and bend or flare them outwardly against the inclined walls 57 of the lower die. The rear corners 100 of the upper die member 95 are cut away or inclined somewhat as shown in Fig. 4 to allow a better clearance for the passage of the rounded tips of the arms. This will be understood from a comparison of Figs. 4 and [illegible]

[illegible] that the ends of the arms are [illegible] outwardly as shown in Fig. [illegible] supported on the inclined walls [illegible] and is only guided thereafter [illegible] which is lower than [illegible] of the guide member 56. This will be seen from the comparison of Figs. 17 and [illegible]. The inclined wall 101 is a continuation of the inclined wall 57. The opposite [illegible] guide bar 58 [illegible] 102. These are [illegible] bars 103 and [illegible] the inclined plunge[illegible] the upper holder [illegible]. These [illegible] 105 shaped at 106 [illegible] of the bend just above the upper edge of the guide bar 58 and [illegible] the upper edge of the bend as shown in [illegible]. The side walls 107 are [illegible] to engage the folded bases 34 of the arms to [illegible] them down against the lugs 32. The [illegible] member 108 which is shaped at 109 in accordance with the desired shape of the edge of the bend and [illegible] to fit between the adjacent edges of the die members 105 as shown in Fig. 19. [illegible] member 108 is brought down with [illegible] that the dies 105 are [illegible] so that the dies [illegible] simultaneously [illegible] of bend.

The action of the die member 108 straightens out the bead and counteracts any tendency to warp or buckle. A pair of shoes 110 are shaped to fit the sides of the arms of the bead and assist in holding the bead in position while the sides are being indented as just described. Each shoe is guided by a pair of plungers 111 in the slide 102. A spring 112 presses against each plunger and tends to press it and its shoe inwardly toward the center of the machine. At the same time each spring presses outwardly against the slide and tends to hold the slide away from the center and retract it from the position shown in Fig. 19 to the position shown in Fig. 18. The action of the mechanism thus far described completes the bead except as to the longitudinal side reinforcing wires.

It will be noted that the rib forming dies act to rib up the central portion of the stock above the plane of the stock and that the side forming dies carry the metal forming the sides of the bead down below the plane of the stock. This action of forming up the bead by displacing the center and edges of the stock to opposite sides of the original flat plane of the stock facilitates movement through the machine without buckling of the stock.

In case the wires are to be used they may be attached as hereinafter briefly mentioned. The tangs 36 are formed by punches 115 carried by the vertically movable upper holder 51 and coöperate with the appropriately shaped die openings 116 in the cutter members 60. The tangs are lifted from the die openings 116 by plungers 117 which are carried by the arms 118 attached to the lower stripper plate 72. The shape of the lower end of the punch cutter 115 is preferably such as to give a slight initial outward curl to the tip of the tang 36 as shown in Fig. 20. The lower inner walls 99 of the upper die member 95 are preferably raised at 119 to afford clearance for the tangs 36 as shown in Fig. 17. The wires 35 are guided into the machine in tubes 120 which extend through grooves 121 in the outer faces of the die members 60, beneath the lifter plate 72, along side the guiding die 57 and are also inclined inwardly as shown in Fig. 8 to deliver the wires at the ends of the arms adjacent the tangs at the right hand end of the machine as viewed in Figs. 4, 5, 7, 8, 20 and 21. Dies 122 are carried by the laterally movable slides 102 for engaging the ends of the arms and the wires as shown in Fig. 21 when the slides move inwardly. The plungers 123 pivotally carried by the vertically movable holder 51 are drawn toward each other by a spring 124. The lower ends 125 are shaped so as to engage the tips of the tangs as the plungers move downward from the position shown in Fig. 20. The continued downward movement causes the ends of the plungers 123 to slide down and out along the inclined walls 31 and curl over the tangs into position shown in Fig. 21, the die jaws 122 being in back of plungers 123 to hold the wires in position during the curling. These attach the wires to the arms of the bead. To more securely attach the wires and arms the delivery rolls 45 and 46 may be constructed and adjusted so as to relatively indent the ends of the arms and the tangs into the wires. For this purpose the rolls are provided with nurling grooves 128, 129 and the space between the rolls is adjusted to give the desired action. To hold the bead in its proper place between the rolls in the swaging action, a grooved holding bar 130 is provided which presses down against the edge of the bead and extends through a space between the rolls. In the absence of such a structure the swaging pressure is likely to force the bead out of place and produce irregular action.

While the machine as shown and described is adapted to the construction or the manufacture of a particular corner bead it should be understood that the invention is not considered as limited to the particular mechanism or combination and that these features and combinations of mechanism, the principles of which are herein illustrated, may be utilized in other ways and combinations and for the formation of other constructions. The wording of the claims is to be considered as of description rather than limitation except so far as required by the prior art.

What I claim is:—

1. In a metal working machine, means for feeding a strip of metal, dies for cutting arms from said strip at opposite sides of the center, dies for bending the ends of the arms out of the plane of the strip, dies for ribbing the strip between the arms, dies for bending the arms, dies for bending the sides of the strip toward each other adjacent the ribbed edge, dies for attaching wire edge members and means for indenting portions of the ends of the arms into the wire edge members, said dies being brought into action consecutively.

2. In a metal working machine, means for feeding a strip of metal in, dies for cutting arms from said strip at opposite sides of the center, dies for bending the ends of the arms out of the plane of the strip, dies for ribbing the strip between the arms, dies for folding and bending intermediate portions of the arms, dies for indenting the sides of the strip toward each other adjacent the ribbed edge, means for attaching wire edge members, means for feeding out the product and means for bringing said dies into action consecutively.

3. In a [illegible] machine, means for feeding [illegible] metal, dies for cutting arms from said strip at opposite sides of the center, dies for bending the ends of the arms out of the plane of the strip, dies for bending the strip between the arms, and means for attaching wire edge members, said dies being brought into action consecutively.

4. In a [illegible] working machine, strip feeding means, dies for cutting arms, dies for punching tangs from said arms, means for bending said arms and means for bending said tangs around side wires.

5. In a metal working machine, strip feeding means, means for bending arms at opposite sides of the center of the strip, and means for attaching the ends of the arms to lateral reinforcing wires.

6. In a metal working machine, means for feeding a strip of metal, dies for cutting arms from said strip at opposite sides of the center, dies for bending the ends of the arms out of the plane of the strips, dies for ribbing the strip between the arms, dies for bending the arms and dies for bending the sides of the strip toward each other adjacent the ribbed edge and means for bringing said dies into action consecutively.

[illegible] machine, a central [illegible] cutting arms at opposite [illegible] dies and dies [illegible] strip.

[illegible] machine, spaced [illegible] ridging [illegible] dies and a punch- [illegible] said arm cutting dies [illegible] die to cut the arms [illegible] at the same time ridge the [illegible] between the arms over [illegible]

[illegible] machine, means [illegible] the sides of a strip, [illegible] the arms, means for [illegible] guide bar and [illegible] arranged to indent [illegible] guide bar.

[illegible] machine, a cen- [illegible] means for rib- [illegible] guide bar, means for [illegible] and a straighten- [illegible] the folded edge of the [illegible] a guide bar.

[illegible] machine, a central [illegible] for feeding a bead [illegible] lateral shoes for [illegible] said die and laterally [illegible] of a [illegible] die.

[illegible] machine, a central [illegible] means [illegible] lateral [illegible] the bead [illegible] laterally operable [illegible] sides of the said bead.

13. In a metal working machine, a central die, lateral shoes, springs for pressing said shoes toward the base of said die, laterally movable dies for forming the sides of a strip and a straightening die coacting therewith on the strip.

14. In a metal working machine, means for intermittently feeding a strip of metal, a guide plate for supporting it along the center, dies for bending the sides of the strip downward over said guide plate, dies for indenting intermediate portions of the sides inward and a straightening die for engaging the folded edge, said dies being brought into action consecutively.

15. In a metal working machine, means for intermittently feeding a strip of metal, a guide plate for supporting it along the center, dies for bending the sides of the strip downward over said guide plate and dies for indenting intermediate portions of the sides inward, said dies being brought into action consecutively.

16. In a metal working machine, means for feeding a strip of metal, a guide plate for supporting it along the center, dies for cutting the sides of the strip, dies for bending the sides of the strip downward over said guide plate, dies for bending intermediate portions of the sides inward and a straightening die for engaging the folded edge, said dies being brought into action consecutively.

17. In a metal working machine, means for feeding a strip of metal, a guide plate for supporting it along the center, dies for cutting the sides of a strip, dies for bending the sides of the strip downward over said guide plate and a straightening die for engaging the folded edge, said dies being brought into action consecutively.

18. In a metal working machine, means for intemittently feeding a strip of metal, dies for cutting the sides of the strip, a guide plate for supporting the strip along the center, dies for bending the sides of the strip downward over said guide plate, dies for bending intermediate portions of the sides inward and a die for engaging the folded edge, said dies being brought into action consecutively.

19. In a metal working machine, means for intermittently feeding a strip of metal, dies for cutting the sides of the strip, a guide plate for supporting the strip along the center, dies for bending the sides of the strip downward over said guide plate and dies for bending intermediate portions of the sides inward, said dies being brought into action consecutively.

20. In a corner bead machine, means for feeding a strip of metal, a guide plate for supporting it along the center, dies for punching the sides of the strip, dies for bending parts of the sides of the strip downward over said guide plate, dies for bending intermediate portions of the sides inward and a shaping die for engaging the folded edge, said dies being brought into action consecutively.

21. In a corner bead machine, means for feeding a strip of metal, a guide plate for supporting it along the center, dies for punching the sides of the strip, dies for bending parts of the sides of the strip downward over said guide plate, dies for bending intermediate portions of the sides inward, a shaping die for engaging the folded edge, said dies being brought into action consecutively and means for feeding the product out.

22. In a metal working machine, intermittent strip feeding means, grooved guiding rings, centering pins operable therein, upper and lower lateral arm cutting dies, a movable lifting plate for stripping the stock from the lower cutting dies and a plate for stripping the stock from the upper cutting dies.

23. In a metal working machine, intermittent strip feeding means, grooved guiding rings, centering pins operable therein, upper and lower lateral arm cutting dies, a movable lifting plate for stripping the stock from the lower cutting dies, a plate for stripping the stock from the upper cutting dies and vertically movable swinging dogs for engaging said lifting plate.

24. In a metal working machine, spaced die cutters, a lifting plate between said cutters, a vertically movable holder, a punch cutter carried thereby and pivoted dogs carried by said holder for momentarily engaging said plate to lift it.

25. In a metal working machine, a pair of oppositely disposed die cutters having longitudinal cutting edges on their adjacent faces and a transverse cutting edge on one end of each cutter connected with its longitudinal cutting edge and a punch cutter having cutting edges corresponding to the cutting edges of said die cutters.

26. In a metal working machine, a pair of oppositely disposed die cutters having longitudinal cutting edges on their adjacent faces and a transverse cutting edge on one end of each cutter connected with its longitudinal cutting edge and a shorter angular cutting edge connected to the opposite end of said longitudinal edge and a punch cutter having cutting edges corresponding to the cutting edges of said die cutters.

27. In a metal working machine, laterally disposed arm cutters comprising two spaced die cutters having cutting edges for outlining the arms and interior tang cutting edges, a punch cutter having cutting edges coöperating with the arm cutting edges of the die cutters and punches coacting with [illegible]

28. In a metal working machine, laterally disposed arm cutters comprising two spaced die cutters having cutting edges for outlining the arms and interior tang cutting edges, a punch cutter having cutting edges coöperating with the arm cutting edges of the die cutters, punches coacting with the tang cutting edges, a stripping plate extending adjacent the arm cutting edges of the die cutters and stripping rods carried by said plate and extending into said die cutters adjacent said tang cutting edges.

29. In a metal working machine, arm bending dies having bending edges disposed at flaring angles, bending punches on opposite sides thereof, a stripper plate surrounding said bending dies and means for operating said stripper plate.

30. In a metal working machine, means for bending arms out of the plane of a strip, means for bending the edges of the strip between the arms and means for folding the bases of the arms.

31. In a metal working machine, a center guiding die, a vertically movable grooved bending die coöperating therewith and having depending bending fingers and being cut away adjacent said fingers.

32. In a metal working machine, a central guiding die bar with outwardly inclined lower die faces and a vertically movable grooved die having depending sides with outwardly flaring extensions for engaging the edges of metal arms and folding the bases of the arms at the sides of the central guiding die bar and bending intermediate portions of the arms.

33. In a metal working machine, a supporting die having a central guide bar, laterally operable indenting jaws arranged to approach each other just above said guide bar and a die arranged to engage the stock while supported by said bar and engaged by said indenting jaws.

34. In a metal working machine, a central guide bar for grooved stock, means for feeding said grooved stock along the guide bar, laterally operable jaws, a vertically movable holder, a die carried thereby above said bar, and means carried by said holder for operating said jaws to contract the sides of the grooved stock above the guide bar when the holder and its die descend.

35. In a metal working machine, a longitudinal support for the bead, laterally movable wire holding dies and vertically movable tang curling dies arranged to operate in conjunction with said support and said laterally movable dies to curl tangs from a bead on the support around wires held by the wire holding dies.

36. In a metal working machine, an inclined support, a movable grooved wire receiving die, a curling die and means for moving said curling die along the face of said support to curl a tang from an arm on said support around a wire in said grooved die.

37. In a metal working machine, an inclined bead support, a lateral wire die and a pivoted vertically movable curling die and means for operating said dies and attaching a wire to a bead.

38. In a metal working machine, a bead support, a vertically movable holder, a pair of curling dies carried thereby and lateral dies operated by said holder in conjunction with said curling dies.

39. In a metal working machine, means for cutting arms from a strip and slightly curling the ends of the arms and means for attaching the slightly curled ends of the arms to a reinforcing wire.

40. In a metal working machine, a pair of setting rolls having oppositely located knurled grooves and a holding bar extending between said rolls for engaging the edge of a bead to thereby hold the arms of the bead and side wires of the bead in the knurled grooves.

41. In a corner bead machine the combination of a series of dies for successively acting upon a strip to progressively form it into the desired shape and comprising dies for forming an arched rib along the center of the strip of metal, dies for flattening the top of the arch and bending the sides of the arch squarely away from the top, dies for gradually flaring the edges of the strip and dies for indenting the sides between the top and the edges and simultaneously again arching the top.

42. In a corner bead machine, the combination of a series of dies for successively acting upon a strip to progressively form it into the desired shape, comprising a plurality of dies for gradually forming a central rib with a flat top and square edges, dies for gradually bending the edges of the strip toward each other and dies for gradually indenting the sides adjacent the edges of the rib and arching the center of the rib.

43. In a corner bead machine, the combination of a series of sets of dies arranged successively to progressively form the bead from a strip and comprising coacting tongue and grooved dies for ribbing the center of the strip, coacting bending dies having oppositely inclined faces at opposite sides of the center for flaring the edges of the strip, laterally operating dies having ribs for contracting the sides of the strip at each side of the center and coacting grooved dies for shaping the center as desired.

44. In a corner bead machine, the combination of a series of dies successively acting upon a strip, comprising dies for forming a central rib, dies for cutting the strip on each side of the central rib, dies for then bending the sides inclined in opposite directions from the center and dies for then completing the formation of the central rib into the bead proper.

45. In a corner bead machine, the combination of a series of dies arranged to receive a strip, progressively rib it along the center and bend the sides in opposite directions, the line of the centers of the successive dies departing from one face of the original plane of the stock and the edges of the said successive dies gradually departing from the opposite face of the original plane of the stock, said dies comprising dies for ribbing the center of the strip, dies for bending the edges and dies for contracting the sides adjacent the central rib.

46. In a corner bead machine, the combination of dies for cutting the sides of the strip to form openings, dies for bending said sides to form the central portion of said strip into a nose and laterally operating movable dies for contracting the sides at a point adjacent the nose thereof to thereby form the said nose into an undercut bead.

47. In a corner bead machine, coacting upper and lower dies, one of said dies projecting part way in between the folded sides of a strip and the other of said dies engaging the folded center of the strip, laterally movable dies engaging unsupported portions of the sides of the folded strip between the aforesaid upper and lower dies to thereby contract the sides of the bead back of the folded center thereof, and means for causing said dies to simultaneously coact upon the bead.

48. In a corner bead machine, spaced apart rolls grooved to receive the edges of a strip therebetween to center the strip, means for bending the central portion of the strip guided by said rolls into a bead, and means for bending portions on opposite sides of the central portion of the strip on divergent angles.

NORRIS ELMORE CLARK.

Witnesses:

D. G. CLARK,

E. E. DANIELS.